(12) United States Patent
Nakasone (10) Patent No.: US 10,570,655 B2
(45) Date of Patent: Feb. 25, 2020

(54) STOPPER DEVICE

(71) Applicant: PIOLAX, INC., Yokohama-shi (JP)

(72) Inventor: Hisashi Nakasone, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 62 days.

(21) Appl. No.: 15/543,598

(22) PCT Filed: Jan. 20, 2016

(86) PCT No.: PCT/JP2016/051491
§ 371 (c)(1),
(2) Date: Jul. 14, 2017

(87) PCT Pub. No.: WO2016/121583
PCT Pub. Date: Aug. 4, 2016

(65) Prior Publication Data
US 2017/0370140 A1 Dec. 28, 2017

(30) Foreign Application Priority Data

Jan. 26, 2015 (JP) .................................. 2015-012627

(51) Int. Cl.
*E05F 5/02* (2006.01)
*E05C 19/16* (2006.01)
(Continued)

(52) U.S. Cl.
CPC .............. *E05F 5/022* (2013.01); *E05C 19/16* (2013.01); *B60R 7/06* (2013.01); *E05B 83/30* (2013.01);
(Continued)

(58) Field of Classification Search
CPC ... E05F 5/02; E05F 5/022; E05F 5/025; E05F 5/06; E05F 5/08; E05F 5/10; F16F 1/128;
(Continued)

(56) References Cited

U.S. PATENT DOCUMENTS 256,045 A * 4/1882 Poulson .................... E05F 5/06
16/86 A
371,646 A * 10/1887 Vance .................. E05C 19/063
292/17
(Continued)

FOREIGN PATENT DOCUMENTS

JP S 41-1573 Y1 2/1966
JP H 05-50188 U 7/1993
(Continued)

OTHER PUBLICATIONS

International Search Report (ISR) (PCT Form PCT/ISA/210), in PCT/JP2016/051491, dated Feb. 23, 2016.

*Primary Examiner* — Jeffrey O'Brien
(74) *Attorney, Agent, or Firm* — McGinn IP Law Group, PLLC.

(57) ABSTRACT

A stopper device includes: a stopper that has an abutting part located at a distal end of a tubular part in the axial direction, and a through-hole penetrating through the abutting part and communicating with the inside of the tubular part; and a screw that has a flange-shaped screw head accommodated in the tubular part, and a shaft projecting toward a proximal end side of the tubular part in the axial direction. The tubular part has a first restricting part that restricts movement of the stopper toward the distal end in the axial direction by being engaged with the screw head. The position of the stopper in the axial direction is changed by inserting a tool in the tubular part through the through-hole and rotating the screw.

18 Claims, 10 Drawing Sheets

(51) Int. Cl.
 *E05B 83/30* (2014.01)
 *B60R 7/06* (2006.01)
(52) U.S. Cl.
 CPC ..... *E05Y 2201/224* (2013.01); *E05Y 2600/12* (2013.01); *E05Y 2900/538* (2013.01); *Y10T 16/625* (2015.01)
(58) Field of Classification Search
 CPC .... A47B 2210/0018; A47B 2210/0094; Y10T 16/625
 USPC .............. 16/82, 83, 85, 86 R, 86 A; 267/139
 See application file for complete search history.

(56) References Cited

U.S. PATENT DOCUMENTS

| | | | | |
|---|---|---|---|---|
| 1,354,469 A * | 10/1920 | Daniele | ..................... | E05F 5/06 16/86 A |
| 2,596,780 A * | 5/1952 | Meyers | ..................... | B60G 7/04 16/86 A |
| 2,899,703 A * | 8/1959 | Johnson | ..................... | E05F 5/06 16/86 A |
| 3,258,285 A * | 6/1966 | Smith | ..................... | E05C 17/56 292/251.5 |
| 3,274,638 A * | 9/1966 | Bien | ..................... | E05B 83/24 16/86 A |
| 3,484,891 A * | 12/1969 | Borgen | ..................... | E05F 5/06 16/86 A |
| 3,864,785 A * | 2/1975 | Hoppock | ..................... | E05F 5/06 16/86 A |
| 3,969,786 A * | 7/1976 | Peak | ..................... | E05F 5/06 16/86 A |
| 4,358,214 A * | 11/1982 | Shull | ..................... | F16B 12/12 403/234 |
| 5,887,917 A * | 3/1999 | Luciana | ..................... | E05C 17/56 16/82 |
| 6,039,388 A * | 3/2000 | Choi | ..................... | E05F 5/022 16/86 R |
| 6,088,878 A * | 7/2000 | Antonucci | ..................... | E05F 5/022 16/86 A |
| 6,119,306 A * | 9/2000 | Antonucci | ..................... | E05F 5/022 16/86 A |
| 6,295,697 B1 * | 10/2001 | Simon | ..................... | E05F 5/02 16/86 A |
| 6,507,976 B2 * | 1/2003 | Ichimaru | ..................... | E05F 5/022 16/2.1 |
| 7,114,217 B2 * | 10/2006 | Matsuzawa | ..................... | E05F 5/022 16/2.2 |
| 7,168,130 B2 * | 1/2007 | Shin | ..................... | B60R 7/06 16/82 |
| 7,356,879 B2 * | 4/2008 | Dembowsky | ..................... | F16B 5/0233 16/82 |
| 7,469,445 B2 * | 12/2008 | Dennis | ..................... | E05F 5/022 16/82 |
| 7,566,081 B2 * | 7/2009 | Aoyama | ..................... | E05F 5/022 293/104 |
| 8,052,233 B2 * | 11/2011 | Netzer | ..................... | A47B 95/043 312/330.1 |
| 8,291,547 B2 * | 10/2012 | Ukai | ..................... | F16B 21/086 16/86 R |
| 8,407,857 B2 * | 4/2013 | Sugiyama | ..................... | F16F 1/371 16/86 R |
| 8,984,715 B2 * | 3/2015 | Kaji | ..................... | E05F 5/022 16/86 R |
| 8,991,008 B2 * | 3/2015 | Vigeh | ..................... | B64C 1/14 16/82 |
| 9,212,512 B2 * | 12/2015 | Nakasone | ..................... | F16F 1/128 |
| 9,410,354 B2 * | 8/2016 | Nakasone | ..................... | E05F 1/105 |
| 9,739,327 B2 * | 8/2017 | Kamiya | ..................... | E05F 5/022 |
| 2005/0145767 A1 * | 7/2005 | Nakagaki | ..................... | E05F 5/022 248/345.1 |
| 2006/0101615 A1 * | 5/2006 | Pinzl | ..................... | E05F 5/022 16/82 |
| 2007/0163077 A1 * | 7/2007 | Yang | ..................... | E05F 5/06 16/85 |
| 2008/0265729 A1 * | 10/2008 | Netzer | ..................... | A47B 95/043 312/330.1 |
| 2010/0192335 A1 * | 8/2010 | Ukai | ..................... | F16F 1/373 24/591.1 |
| 2011/0167590 A1 * | 7/2011 | Ukai | ..................... | F16F 1/44 16/85 |
| 2011/0283490 A1 * | 11/2011 | Sugiyama | ..................... | F16F 1/371 24/457 |
| 2013/0149029 A1 * | 6/2013 | Changsrivong | ......... | F16B 17/00 403/361 |
| 2014/0091600 A1 * | 4/2014 | Lusky | ..................... | E05F 5/022 296/207 |
| 2014/0150207 A1 * | 6/2014 | Hattori | ..................... | E05F 5/022 16/82 |
| 2015/0176320 A1 * | 6/2015 | Nakasone | ..................... | F16F 1/128 16/85 |
| 2016/0076294 A1 * | 3/2016 | Alexander | ..................... | E05F 5/022 16/86 R |
| 2016/0145925 A1 * | 5/2016 | Salice | ..................... | E05C 19/16 312/334.44 |
| 2016/0325928 A1 * | 11/2016 | Lepek | ..................... | B65G 63/004 |
| 2018/0106322 A1 * | 4/2018 | Nakasone | ..................... | B60R 7/06 |
| 2018/0355900 A1 * | 12/2018 | Nilsson | ..................... | F16B 12/24 |

FOREIGN PATENT DOCUMENTS

| | | |
|---|---|---|
| JP | 2008-296731 A | 12/2008 |
| JP | 2009-174292 A | 8/2009 |

\* cited by examiner

STOPPER DEVICE

TECHNICAL FIELD

The present invention relates to a stopper device of which the height of a stopper is adjustable.

BACKGROUND ART

An automobile has a glove compartment made up of a box and a lid. A stopper device is provided to the glove compartment on the box rim, and has the function of abutting on the lid of the glove compartment when the lid is closed.

The stopper device disclosed in Patent Document 1 is mounted on the glove compartment on the box rim, and arranged to abut on the lid of the glove compartment when the lid is closed. The stopper device includes a grommet to be inserted into and fixed to a mounting hole of the box of the glove compartment, and a stopper pin to be mounted in a screw hole of the grommet. The stopper pin includes a supporting portion having a rectangular plain plate shape, and a shaft portion drooping from the supporting portion. The stopper pin is connected to the grommet by having its shaft portion screwed into the screw hole of the grommet. By grasping and rotating the supporting portion of the stopper pin, the height of the supporting portion from the grommet can be adjusted.

CITATION LIST

Patent Literature

Patent Document 1
JP-2008-296731-A

SUMMARY OF THE INVENTION

Problem that the Invention is to Solve

In the technique disclosed in Patent Document 1, the supporting portion of the stopper pin is exposed, so that the supporting portion could be rotated by an unintended external force to change in height.

The present invention is made in view of the above problem, and an object of the present invention is to provide a stopper device including a height-adjustable stopper, whereby an unintended change in height of the stopper is prevented.

Means for Solving the Problem

In order to solve the above-described problem, an embodiment of the present invention provides a stopper device to be mounted in a mounting hole of a mount-base member, the stopper device including: a stopper including a cylindrical portion, an abutting portion disposed at an axial distal end of the cylindrical portion, and a through-hole penetrating the abutting portion in an axial direction to communicate with an inside of the cylindrical portion; and a screw including a screw head portion having a flange shape to be housed inside the cylindrical portion, and a shaft portion projecting toward an axial base end of the cylindrical portion. The cylindrical portion includes a first limiting portion arranged to limit movement of the stopper toward the axial distal end by being engaged with the screw head portion. An axial position of the stopper with respect to the mount-base member is changeable by inserting a tool into the cylindrical portion through the through-hole and rotating the screw.

Advantageous Effects of Invention

With the present invention, a stopper device including a height-adjustable stopper can be provided, in which an unintended change in height of the stopper is prevented.

MODE FOR CARRYING OUT THE INVENTION

Figure 1A:
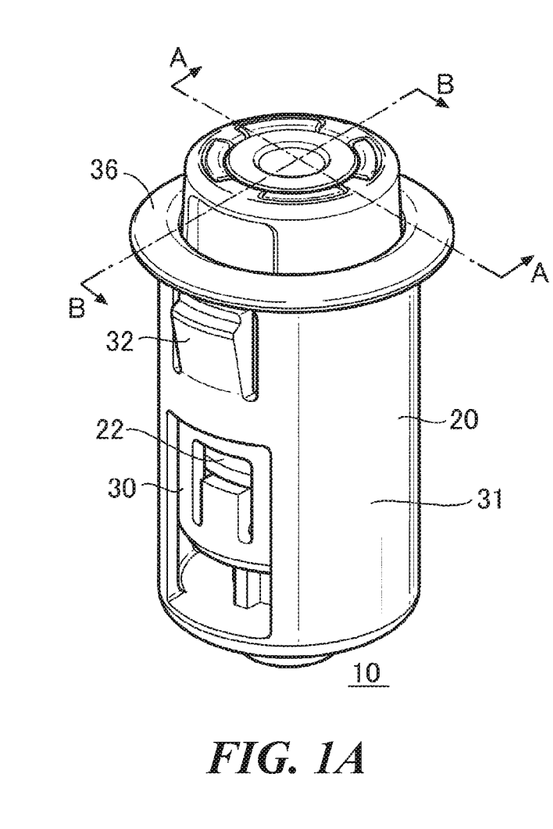
FIG. 1A is a perspective view of a stopper device according to an embodiment.
Figure 1B:
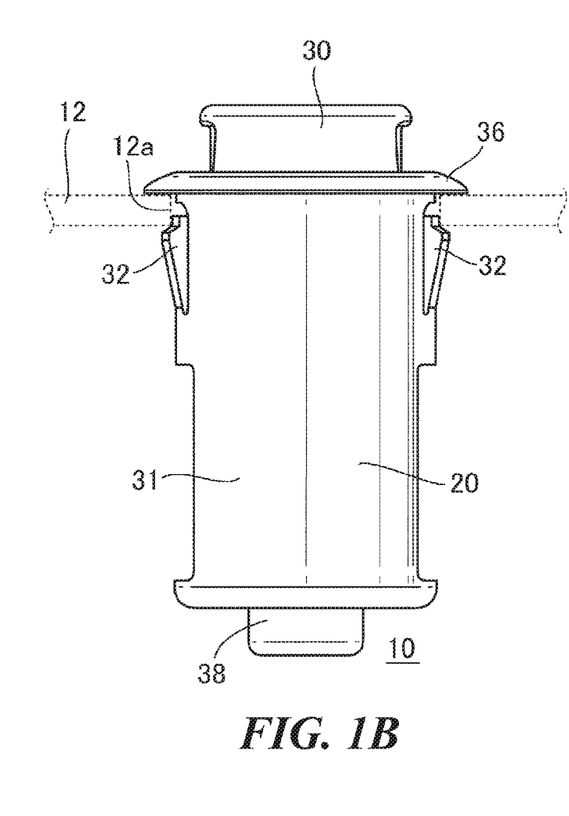
FIG. 1B is a side view of the stopper device.

FIG. 1A is a perspective view of a stopper device 10 according to an embodiment, and FIG. 1B is a side view of the stopper device 10. A mount-base member 12 on which the stopper device 10 is mounted is indicated by a dotted line in FIG. 1B.

The stopper device 10 is mounted in a mounting hole 12a of the mount-base member 12, and used to absorb the impact of collision of the mount-base member 12 with a given member, and/or to prevent the given member from moving in a direction away from the mount-base member 12. For example, the stopper device 10 is mounted on a box of a glove compartment, and abuts on a contact surface of a lid of the glove compartment in the middle of closing the lid to prevent the box and the lid from colliding with each other. The stopper device 10 sucks the lid of the glove compartment with the use of a magnet 28 to prevent the lid from moving in its opening direction.

The mounting hole 12a is provided to the box of the glove compartment on its opening rim, and the stopper device 10 is mounted in the mounting hole 12a. The box of the glove compartment may be a mount-base member fixed to a vehicle body, and the lid of the glove compartment may be an opening and closing body capable of opening and closing the opening of the box. The box of the glove compartment and an instrument panel may be of an integrated structure.

The stopper device 10 includes a case 20, a screw 22, a spring, a yoke 26, a magnet 28, and a stopper 30, and these members are assembled into one unit. Since these members are assembled into one unit, transportation and mounting can be facilitated. Detailed descriptions of these members will be provided with reference to new drawings.

Figure 2:
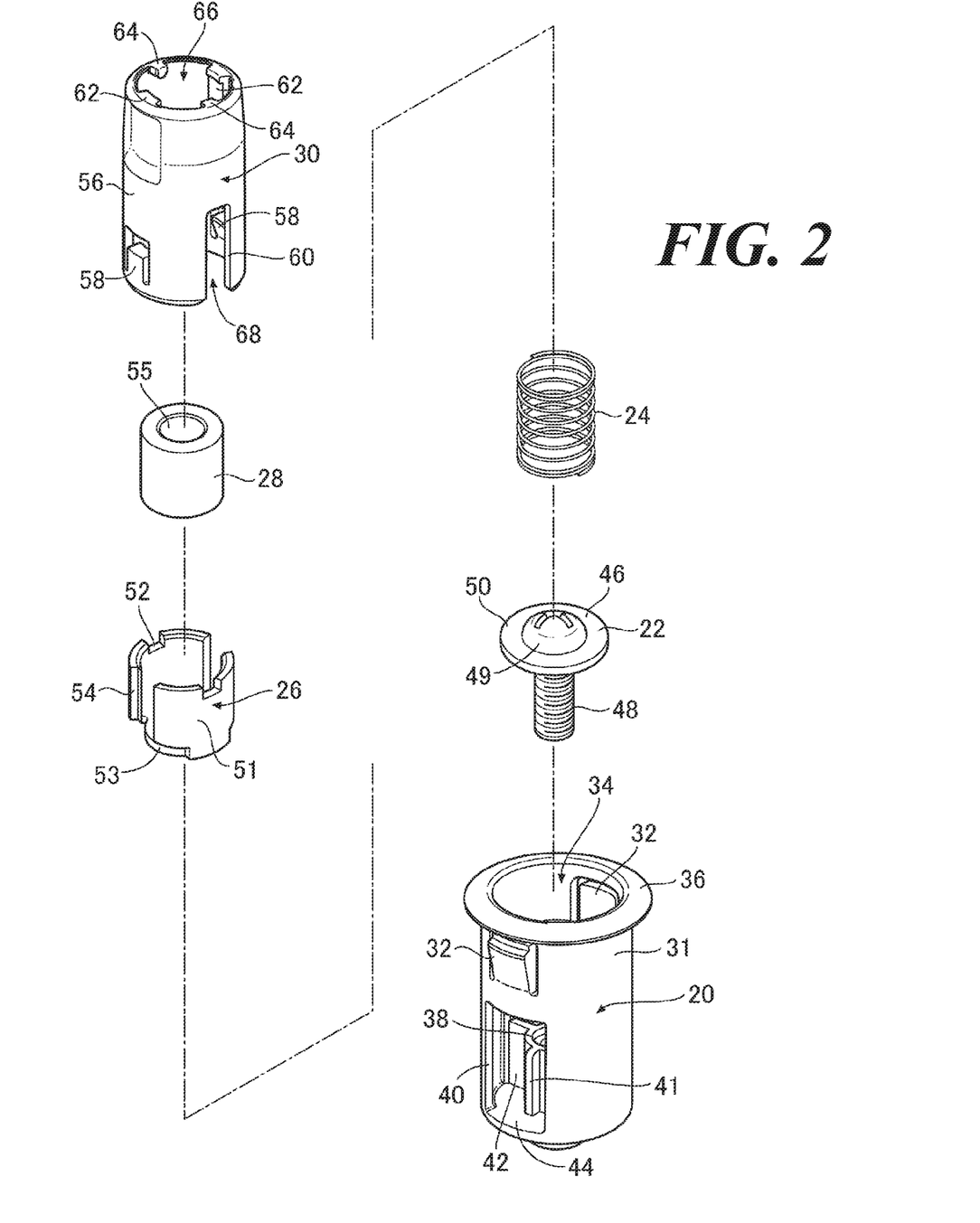
FIG. 2 is an exploded view of the stopper device.

FIG. 2 is an exploded view of the stopper device 10. In the present description, same or equivalent constituent elements shown in the drawings are provided with same reference numerals, and repeated descriptions of the same or equivalent constituent elements are omitted as appropriate.

The case 20 is arranged to house the other members of the stopper device 10, and be mounted on the mount-base member 12. The case 20 includes an outer cylindrical portion 31, mounting portions 32, an opening portion 34, a flange portion 36, a screw receiving portion 38, a lateral hole 40, extending portions 41, a rib 42, and a bottom portion 44. A detailed description of the case 20 will be provided with reference to FIGS. 3A and 3B.

Figure 3A:
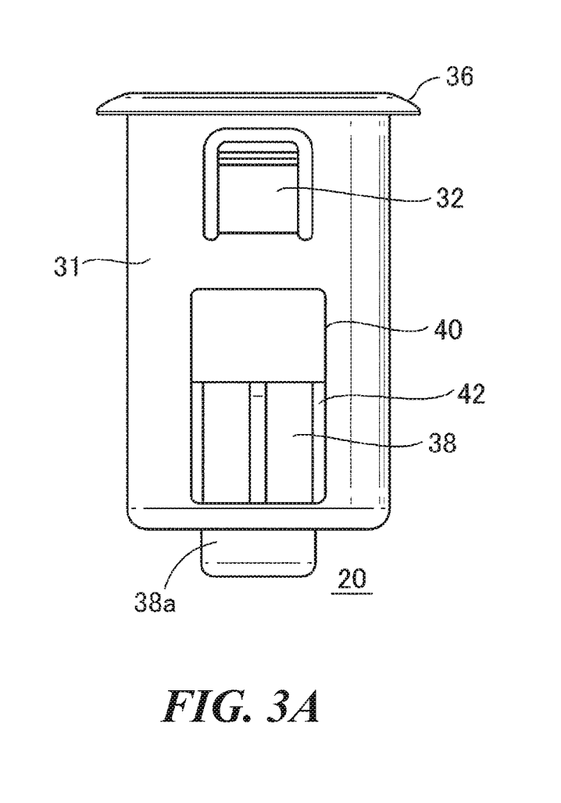
FIG. 3A is a side view of a case.
Figure 3B:
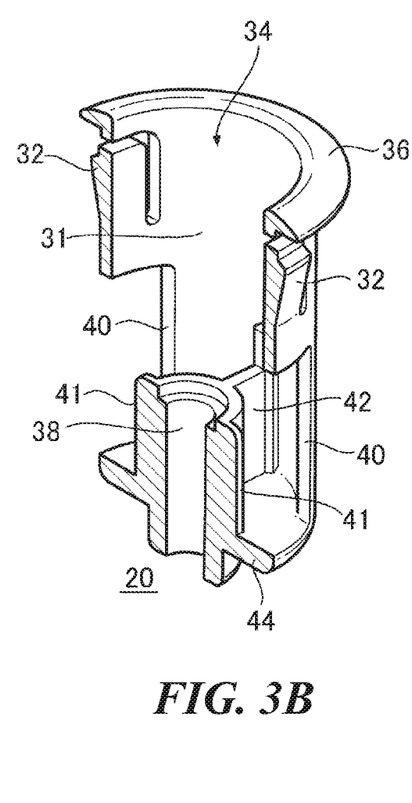
FIG. 3B is a perspective cross-sectional view of the case.

FIG. 3A is a side view of the case 20, and FIG. 3B is a perspective cross-sectional view of the case 20. The outer cylindrical portion 31 has a circular cylindrical shape. The outer cylindrical portion 31 includes the opening portion 34 on one end, and the bottom portion 44 on the other end. That is, the case 20 has a bottom-closed cylindrical shape.

The flange portion 36 is disposed at one end of the outer cylindrical portion 31. The flange portion 36 has the shape of extending outward in the radial direction. The pair of mounting portions 32 are disposed on the outer surface of the outer cylindrical portion 31. The pair of mounting portions 32 project outward in the radial direction so as to form elastic pawls that are bendable in the radial direction. The flange portion 36 and the mounting portions 32 define a given space therebetween such that the rim of the mounting hole 12a of the mount-base member 12 enters the space. Since the pair of mounting portions 32 are bent to latch on the mounting hole 12a by simply pushing in the stopper device 10 into the mounting hole 12a of the mount-base member 12, the mounting work can be facilitated.

The screw receiving portion 38 has a circular cylindrical shape. The screw receiving portion 38 is erected from the bottom portion 44 so as to be screwed with the screw 22 inserted thereinto. The screw receiving portion 38 is coaxial with and smaller in diameter than the outer cylindrical portion 31. A rear end portion 38a of the screw receiving portion 38 projects from the bottom portion 44 to have a sufficient length for receiving a shaft portion 48 of the screw 22.

The rib 42 has a wall shape. The rib 42 extends from the outer peripheral surface of the screw receiving portion 38 to connect the screw receiving portion 38 with the outer cylindrical portion 31. The rib 42 is erected from the bottom portion 44 to the distal end of the screw receiving portion 38. By providing the rib 42, the stiffness of the screw receiving portion 38 can be improved. The lateral hole 40 is provided so as to cut out the side wall of the outer cylindrical portion 31. When the stopper 30 is mounted from the opening portion 34 after the screw 22 is screwed with the screw receiving portion 38, first limiting portions 58 are expanded by a flange portion 50 of a screw head portion 46. On this occasion, the lateral hole 40 allows the first limiting portions 58 to be bent outward. The pair of extending portions 41 has a wall shape. The pair of extending portions 41 extend in the radial direction from the outer peripheral surface of the screw receiving portion 38. The pair of extending portions 41 are disposed at positions different from the rib 42.

FIG. 2 is referred to again. By screwing the screw 22 with the screw receiving portion 38 of the case 20 in a state where the screw 22 is engaged with the stopper 30, the stopper 30 is retained in the case 20. The screw 22 includes the screw head portion 46 and the shaft portion 48. The screw 22 may be a washer head tapping screw or a tapping screw with washer.

The screw head portion 46 includes a pan head 49 having an approximately hemisphere shape, and the flange portion 50 having a flat plate shape of projecting outward from the pan head 49 in the radial direction. The flange portion 50 is arranged to be engaged with the stopper 30, thereby functioning as a receiving face for the spring 24.

The spring 24 is housed in a cylindrical portion 56 so as to urge the stopper 30 in a direction away from the screw 22. The spring 24 may be a coil spring having a shape as if it is penetrated along the central axis. One end of the spring 24 is arranged to abut on the screw head portion 46, and the other end is arranged to abut on the yoke 26 on the stopper side.

The yoke 26 has a cup shape in which a central hole penetrates the bottom portion 53 thereof. The yoke 26 includes a pair of lateral grooves 54 in a side wall 51, and a pair of recess portions 52 at the distal end of the side wall 51. The lateral grooves 54 are arranged to be engaged with longitudinal protruding portions 62 of the stopper 30 to thereby prevent the yoke 26 from being rotated. And, the recess portions 52 are arranged to be engaged with projecting portions 64 of the stopper 30 to thereby retain the yoke 26.

The magnet 28 has a circular cylindrical shape through which a central hole 55 penetrates. The magnet 28 is housed in the yoke 26, and the magnetic force of the magnet 28 is increased by the yoke 26.

The stopper 30 extends out of the opening portion 34 of the case 20 to thereby prevent a lid of a glove compartment from abutting on a box of the glove compartment. A detailed description of the stopper 30 will be provided with reference to FIGS. 4A and 4B.

Figure 4A:
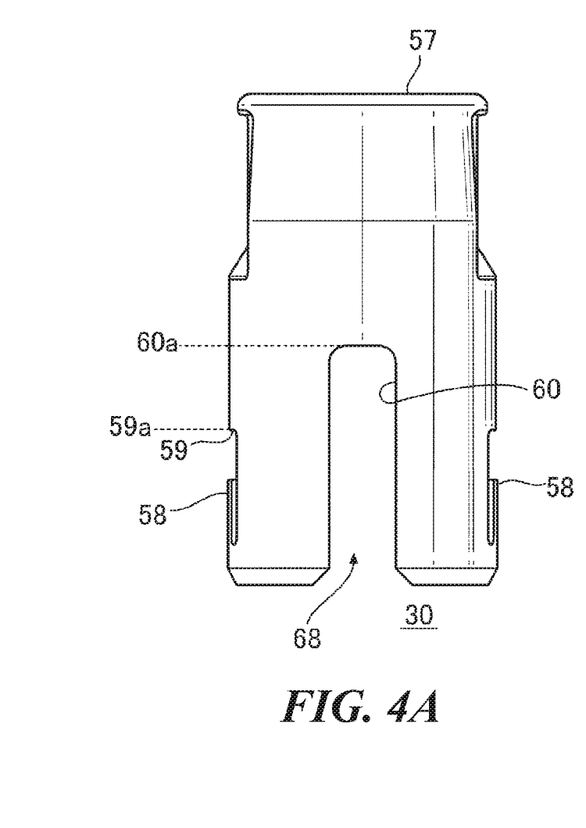
FIG. 4A is a side view of a stopper.
Figure 4B:
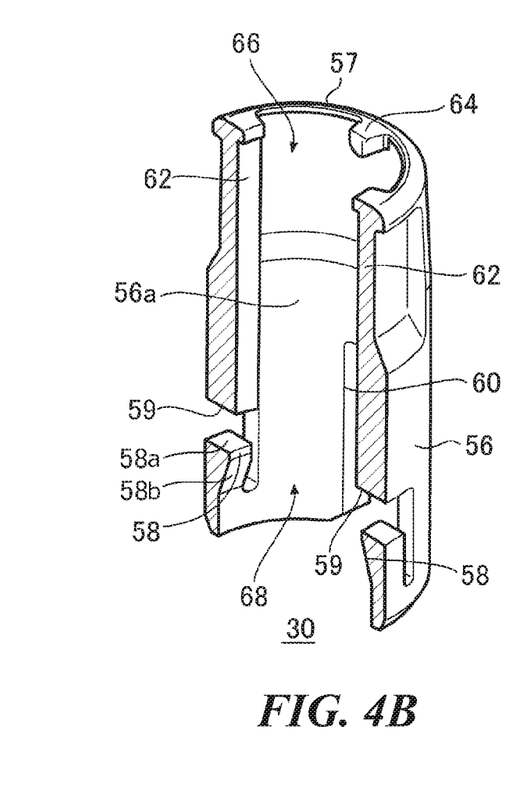
FIG. 4B is a perspective cross-sectional view of the stopper.

FIG. 4A is a side view of the stopper 30, and FIG. 4B is a perspective cross-sectional view of the stopper 30. The stopper 30 includes a cylindrical portion 56, first limiting portions 58, second limiting portions 59, slit portions 60, longitudinal protruding portions 62, projecting portions 64, a through-hole 66, and an insertion opening 68.

At the axial distal end of the cylindrical portion 56, an abutting portion 57 is provided to abut on a lid of a glove compartment. In the center of the abutting portion 57, the through-hole 66 is provided to penetrate the abutting portion 57 in the axial direction.

The insertion opening 68 into which the screw 22 is inserted is provided to the cylindrical portion 56 on the axial rear end side. The pair of first limiting portions 58 project inward from an inner peripheral surface 56a of the cylindrical portion 56 in the radial direction, and the pair of second limiting portions 59 project inward from the inner peripheral surface 56a of the cylindrical portion 56 in the radial direction. The first limiting portions 58 and the second limiting portions 59 are engaged with the side edge of the flange portion 50 of the screw head portion 46, thereby functioning as limiting portions for limiting the axial relative movement of the screw head portion 46 and the cylindrical portion 56.

The first limiting portions 58 are formed as if the side wall of the cylindrical portion 56 is cut out to extend along the axial direction from the rear end side toward the opening portion 34. The first limiting portions 58 form elastic pawl bodies that are bendable in the radial direction. Each of the first limiting portions 58 includes an engaged surface 58a that is disposed at the distal end of the first limiting portion 58 to be engaged with the flange portion 50, and a tapered protruding portion 58*b* that projects inward in the radial direction. The protruding portions 58*b* are inclined such that their areas protruded inward in the radial direction are gradually increased from the base end side to the distal end side, and arranged to abut on the flange portion 50 when the screw 22 is inserted. The second limiting portions 59 are disposed closer to the axial distal ends than the first limiting portions 58, and separated from the first limiting portions 58. The first limiting portions 58 are disposed on the side closer to the insertion opening 68 than the side closer to the center position of the stopper 30 in the axial direction. When the screw 22 is inserted from the insertion opening 68, the flange portion 50 slides on the protruding portions 58*b* to expand to bend the first limiting portions 58 outward in the radial direction, and then, when the screw 22 is pushed such that the flange portion 50 is received in the spaces between the first limiting portions 58 and the second limiting portions 59, the first limiting portions 58 return to its original state to cause the engaged surfaces 58*a* to be engaged with the side edge of the flange portion 50. The screw 22 can be easily mounted on the stopper 30 by simply pushing in the screw 22 into the insertion opening 68.

The longitudinal protruding portions 62 are formed along the axial direction and project inward from the inner peripheral surface 56*a* of the cylindrical portion 56 in the radial direction, and the second limiting portions 59 are continuous with the longitudinal protruding portions 62. The pair of longitudinal protruding portions 62 are arranged to be engaged with the lateral grooves 54 of the yoke 26, thereby functioning as rotation stoppers for the yoke 26. The pair of projecting portions 64 project inward from the rim of the through-hole 66 in the radial direction to be housed in the recess portions 52 of the yoke 26, thereby functioning as retainers for the yoke 26.

The pair of slit portions 60 are formed as if the cylindrical portion 56 is cut out from the rear end along the axial direction. When the stopper 30 is housed in the case 20, the rib 42 of the case 20 enters the slit portions 60 to thereby prevent the stopper 30 from being rotated. Positions 60*a* behind the slit portions 60 are disposed closer to the abutting portion 57 than positions 59*a* of the second limiting portions 59. As the axial length of the slit portions 60 increases, the movable distance of the stopper 30 in the axial direction increases. Descriptions of the relations among these members will be provided with reference to cross-sectional views.

Figure 5A:
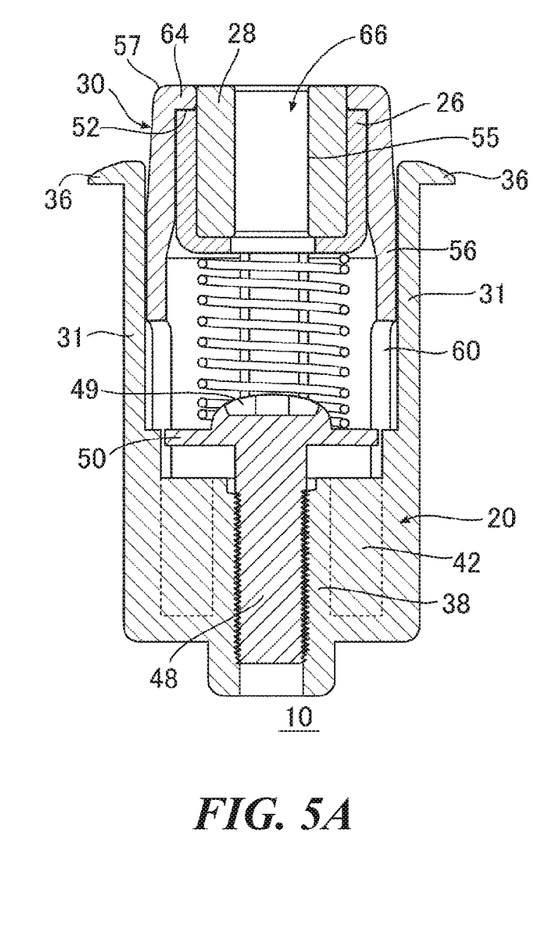
FIG. 5A is a cross-sectional view of the stopper device taken along the line A-A in FIG. 1A.
Figure 5B:
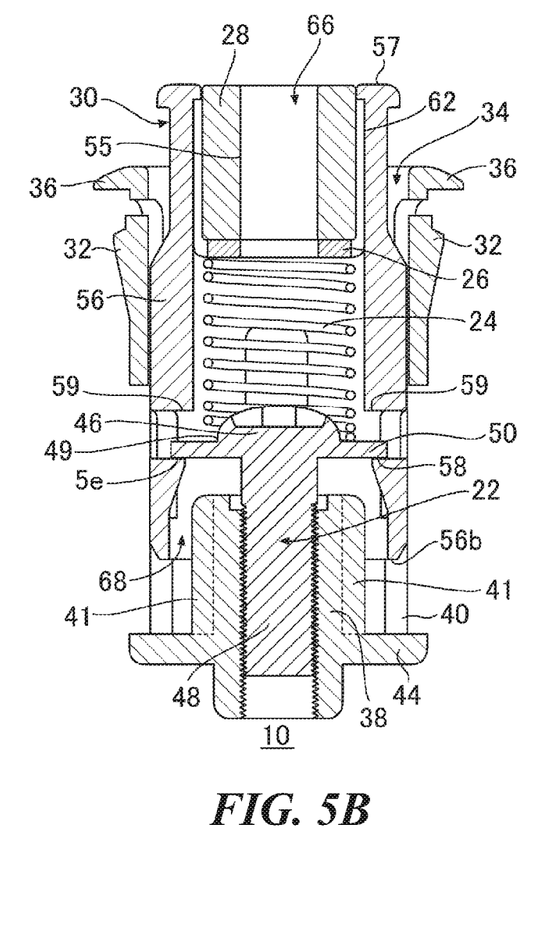
FIG. 5B is a cross-sectional view of the stopper device taken along the line B-B in FIG. 1A.

FIG. 5A is a cross-sectional view of the stopper device 10 taken along the line A-A in FIG. 1A, and FIG. 5B is a cross-sectional view of the stopper device 10 taken along the line B-B in FIG. 1A.

The screw 22 is screwed with and fixed to the screw receiving portion 38 of the case 20 as illustrated in FIG. 5A. The screw head portion 46 is housed in the cylindrical portion 56 of the stopper 30, and the shaft portion 48 projects backward in the axial direction, that is, toward the axial base end. The screw head portion 46 has an outside diameter smaller than the inside diameter of the outer cylindrical portion 31 of the case 20, and is housed in the case 20.

As illustrated in FIG. 5B, the flange portion 50 of the screw 22 enters between the first limiting portions 58 and the second limiting portions 59 of the stopper 30, whereby the axial movement of the stopper 30 with respect to the flange portion 50 is limited. The first limiting portions 58 are engaged with the flange portion 50, whereby the movement of the stopper 30 toward the axial distal end is limited. The second limiting portions 59 are engaged with the flange portion 50, whereby the movement of the stopper 30 toward the axial rear end side is limited. Each of the spaces between the first limiting portions 58 and the second limiting portions 59 is larger in length than the thickness of the flange portion 50, and the flange portion 50 is loosely fitted in the spaces between the first limiting portions 58 and the second limiting portions 59. Thus, the stopper 30 is made movable in the axial direction. The first limiting portions 58 and the second limiting portions 59 make an insertion space for the side edge of the flange portion 50.

The spring 24 has its one end abutting on the flange portion 50, and the other end abutting on the yoke 26, that is, on the stopper 30 side, and urges the stopper 30 in the direction of getting out of the opening portion 34 of the case 20. Thus, the stopper 30 movable in the axial direction can be prevented from rattling. In addition, the spring 24 absorbs the impact of collision between the stopper 30 and a lid of a glove compartment that occurs when the stopper 30 abuts on the lid in closing the lid, and can prevent the lid from vibrating after the lid is closed.

The spring 24 is housed in the cylindrical portion 56, and the rear winding end of the spring 24 abuts on the flange portion 50 while surrounding the pan head 49 of the spring head portion 46. The pan head 49 can prevent the spring 24 from being positionally displaced in the radial direction.

The rear end side of the cylindrical portion 56 of the stopper 30 is opposed to the outer peripheral surface of the screw receiving portion 38, and the cylindrical portion 56 and the screw receiving portion 38 are disposed to overlap with each other in the radial direction as illustrated in FIG. 5B. Thus, the axial length of the stopper device 10 can be reduced to achieve the downsizing of the stopper device 10 compared with a case where the cylindrical portion 56 and the screw receiving portion 38 do not overlap each other. The axial length of the screw receiving portion 38 is made larger than the axial length of the cylindrical portion 56 from the first limiting portions 58 to a rear end portion 56*b* by providing the screw receiving portion 38 erected from the bottom portion 44, so that the rear end portion 56*b* of the cylindrical portion 56 can be prevented from abutting on the bottom portion 44 to be broken when the screw 22 is screwed up.

The extending portions 41 of the case 20 are opposed to the first limiting portions 58 of the stopper 30. The extending portions 41 can prevent the first limiting portions 58 from being excessively bent. The magnet 28 is sucked by the yoke 26 to be exposed from the through-hole 66 of the stopper 30.

The spring 24, the yoke 26, the magnet 28, and the stopper 30 are arranged coaxially, and the through-hole 66 of the abutting portion 57 leads to the pan head 49 of the screw 22. A tool such as a screwdriver for rotating the screw 22 can be inserted into the through-hole 66 in order to adjust the height of the stopper 30 with respect to the mount-base member 12.

Figure 6A:
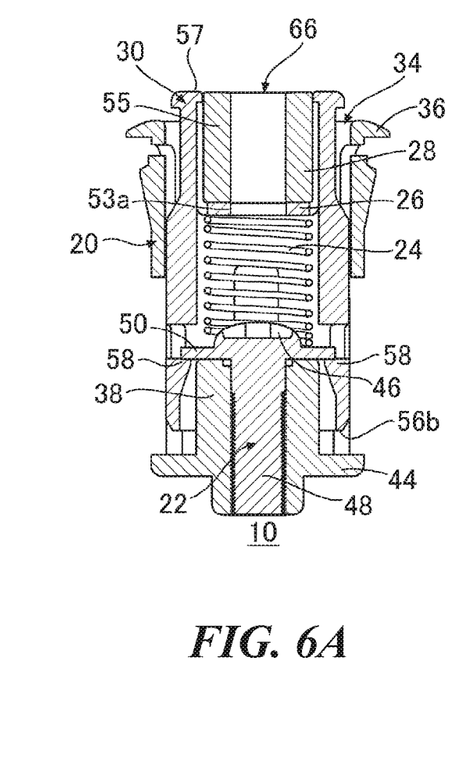
FIGS. 6A to 6C are views for illustrating the height adjusting function of the stopper device.
Figure 6B:
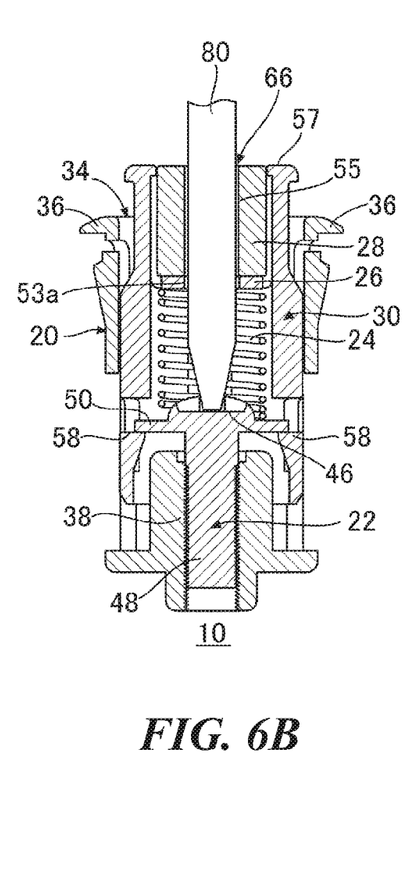
Figure 6C:
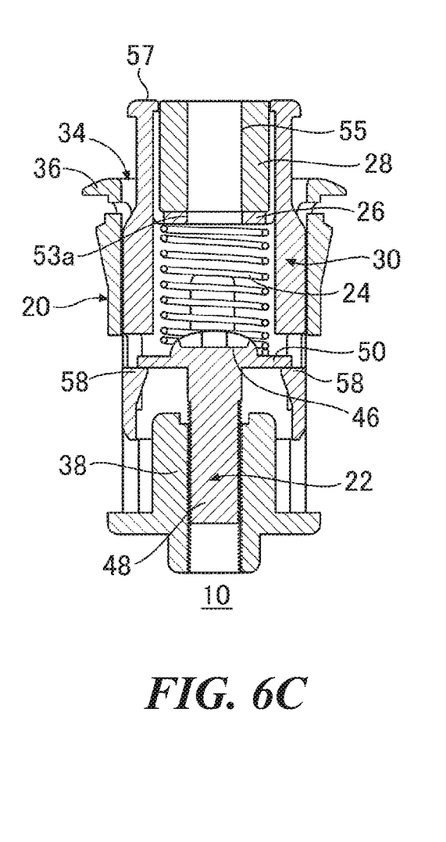

FIGS. 6A to 6C are views for illustrating the height adjusting function of the stopper device 10. In the stopper device 10, the height of the projecting portion of the stopper 30 that projects from the opening portion 34 of the case 20 can be adjusted by rotating the screw 22.

FIG. 6A illustrates the state where the projecting height of the abutting portion 57 of the stopper 30 is the smallest, and the flange portion 50 of the screw 22 is in contact with the distal end of the screw receiving portion 38, whereby the screw 22 cannot be screwed any more. In this state, the first limiting portions 58 are located at the same level as the distal end of the screw receiving portion 38, and the rear end portion 56*b* of the cylindrical portion 56 is separated from the bottom portion 44. Separating the rear end portion 56*b* of the cylindrical portion 56 from the bottom portion 44 can secure a space where the stopper 30 can slide backward in the axial direction.

The through-hole 66 of the abutting portion 57, the central hole 55 of the magnet 28, a central hole 53a of the yoke 26, and the interior space of the spring 24 are arranged coaxially, and the through-hole 66 leads to the pan head 49. A tool 80 is inserted from the through-hole 66, and the distal end of the tool 80 is engaged with the pan head 49 to rotate the screw 22 as illustrated in FIG. 6B. The rotation of the screw 22 changes the axial position of the screw head portion 46 to separate the screw head portion 46 from the screw receiving portion 38 to move the screw head portion 46 in a direction of approaching the opening portion 34 of the case 20.

The tool 80 is detached from the screw 22 after the rotation, and the position of the stopper 30 is changed in accordance with the change in the position of the screw head portion 46, that is, in accordance with the change in the retaining position as illustrated in FIG. 6C. The abutting portion 57 illustrated in FIG. 6C is higher with respect to the opening portion 34 than the abutting portion 57 illustrated in FIG. 6A when they are compared. As described above, the height of the stopper 30 can be made adjustable by rotating the screw 22. Adjusting the height of the stopper 30 can absorb a positional displacement between a box and a lid of a glove compartment, whereby the suction of the magnet 28 can be demonstrated stably.

Unless the tool 80 is inserted into the through-hole 66 as illustrated in FIG. 6B, the screw 22 cannot be rotated, which can prevent a change in height of the stopper 30 caused by the screw 22 rotated by an unintended external force.

Figure 7A:
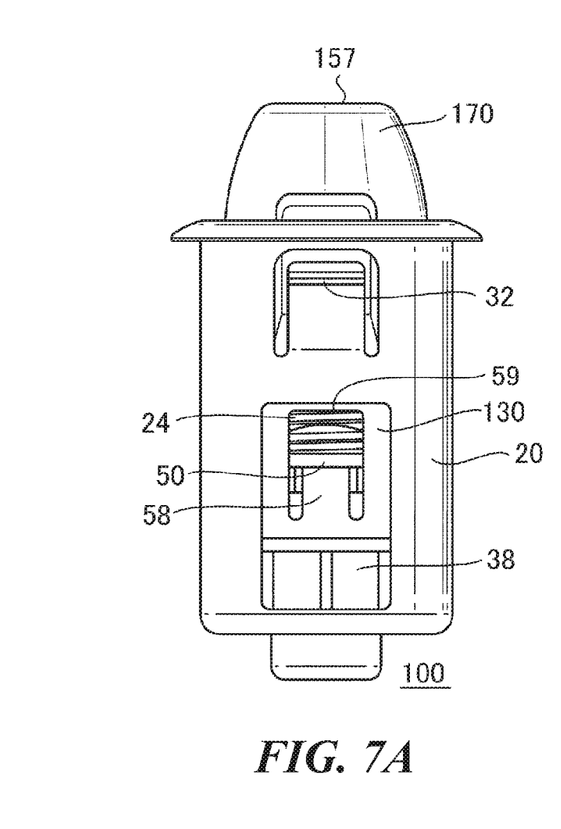
FIGS. 7A and 7B are views for illustrating a stopper device according to the first modification.
Figure 7B:
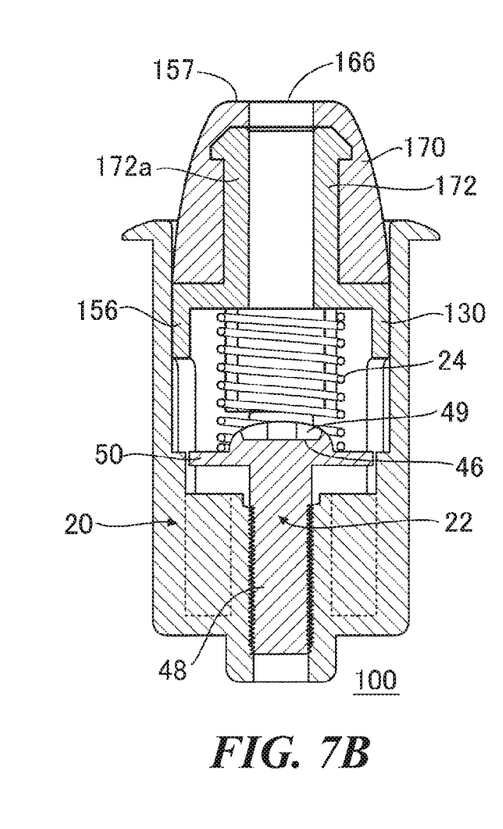

FIGS. 7A and 7B are views for illustrating a stopper device 100 according to the first modification. FIG. 7A is a side view of the stopper device 100, and FIG. 7B is a cross-sectional view of the stopper device 100 taken along the central axis direction. The stopper device 100 according to the first modification includes a stopper 130 that has a different configuration on the distal end side from the configuration of the stopper device 10 illustrated in FIGS. 5A and 5B. The stopper device 100 according to the first modification includes a cushion 170 made of rubber on the distal end side of the stopper 130. The cushion 170 has a buffer function of preventing a box and a lid of a glove compartment from colliding with each other. The stopper device 100 has a configuration, which is the same as the configuration of the stopper device 10, such that the first limiting portions 58 and the second limiting portions 59 of the stopper 130 are engaged with the flange portion 50 of the screw 22, whereby the axial movement of the stopper 130 is limited.

The stopper 130 includes a cylindrical portion 156 made of plastic, and a cushion 170 made of rubber. The cushion 170 latches onto a cylindrical projecting portion 172 provided on the distal end side of the cylindrical portion 156. The cushion 170 also has a ring shape, and an abutting portion 157 includes a through-hole 166. The through-hole 166 and a central hole 172a of the cylindrical projecting portion 172 communicate with the interior space of the spring 24 to lead to the pan head 49. Thus, the screw head portion 46 can be set so as to be rotatable when the tool 80 is inserted while housed to prevent the screw 22 from being unintentionally rotated.

Figure 8A:
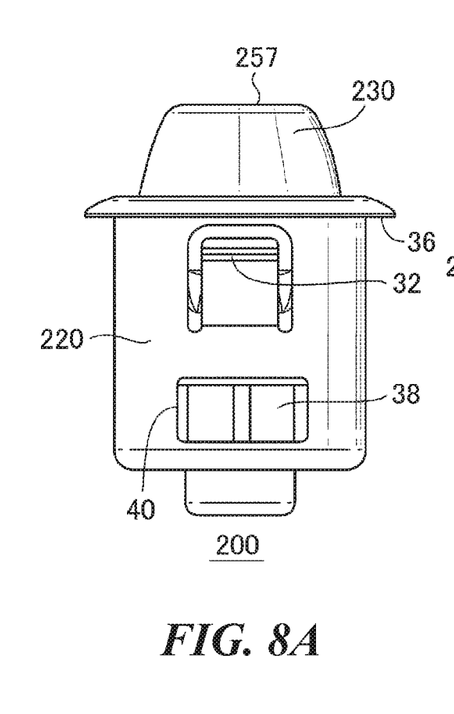
FIGS. 8A to 8C are views for illustrating a stopper device according to the second modification.
Figure 8B:
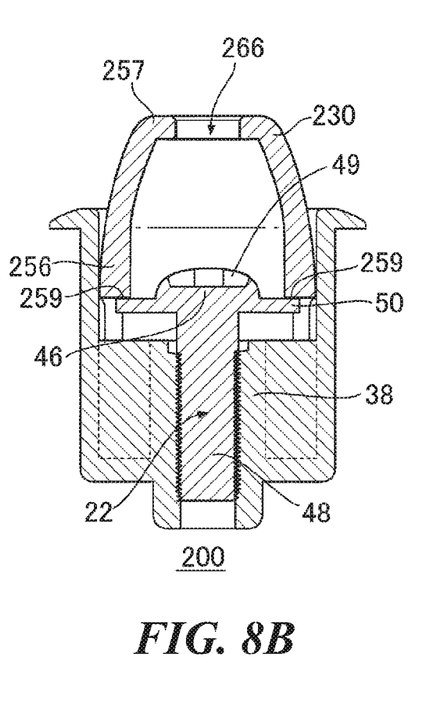
Figure 8C:
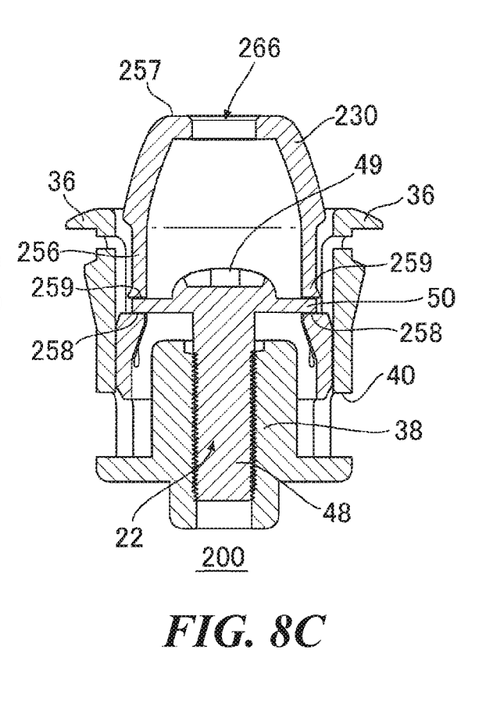

FIGS. 8A to 8C are views for illustrating a stopper device 200 according to the second modification. FIG. 8A is a side view of the stopper device 200, and FIG. 8B is a cross-sectional view of the stopper device 200 taken along the central axis direction. The stopper device 200 according to the second modification has a configuration such that a stopper 230 is not urged by a spring, which is different from the configuration of the stopper device 10 illustrated in FIGS. 5A and 5B.

The stopper 230 is made of rubber capable of absorbing an impact. The stopper 230 is fixed to the flange portion 50 of the screw 22 by first limiting portions 258 and second limiting portions 259, and thus can be prevented from moving in the axial direction. With the configuration that the stopper 230 does not slide, the axial length of a case 220 can be reduced to achieve the downsizing of the stopper device 200, whereby the cost can be reduced.

An abutting portion 257 at the distal end of the stopper 230 is provided with a through-hole 266 that leads to the pan head 49, and with this configuration, the screw 22 is made rotatable. The screw head portion 46 is housed in a cylindrical portion 256 of the stopper 230 to prevent the screw 22 from being unintentionally rotated.

Figure 9A:
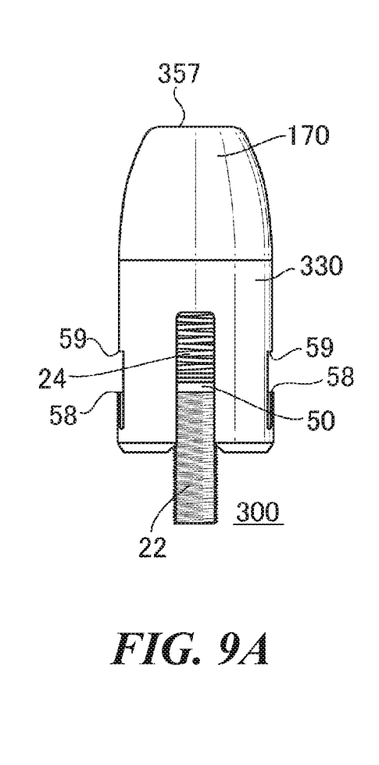
FIGS. 9A to 9C are views for illustrating a stopper device according to the third modification.
Figure 9B:
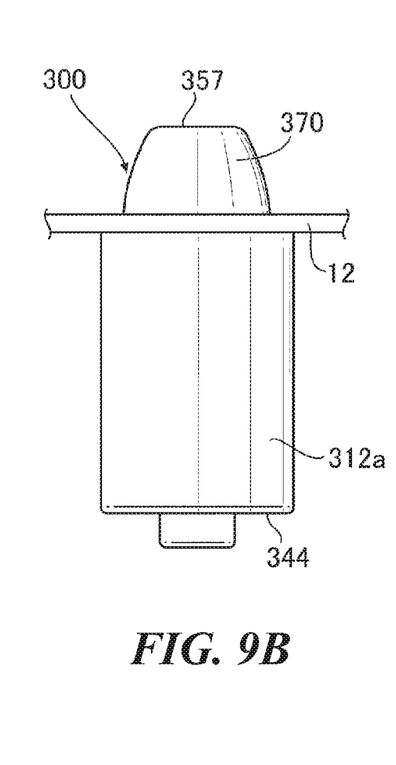
Figure 9C:
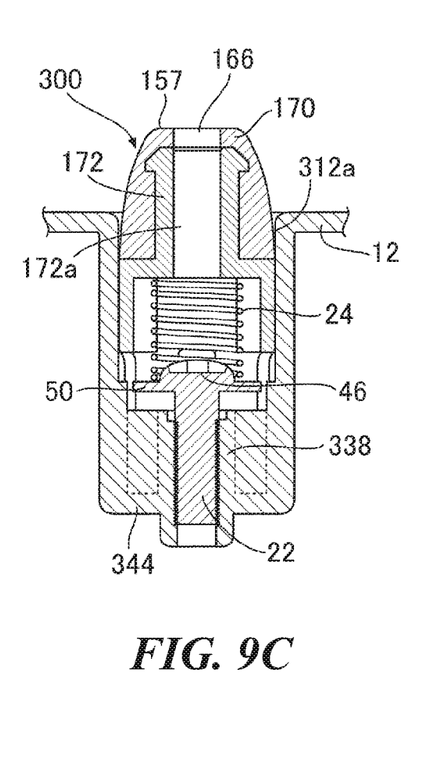

FIGS. 9A to 9C are views for illustrating a stopper device 300 according to the third modification. FIG. 9A is a side view of the stopper device 300, FIG. 9B is a view illustrating the state of being mounted in a mounting hole 312a of the mount-base member 12, and FIG. 9C is a cross-sectional view of the stopper device 300 taken along the central axis direction.

The stopper device 300 according to the third modification includes no case, and has a configuration such that the screw 22 is screwed with a screw receiving portion 338 provided to the mounting hole 312a, which is different from the configuration of the stopper device 100 illustrated in FIG. 7B.

The stopper device 300 includes the screw 22, the spring 24, and a stopper 330 as illustrated in FIGS. 9A and 9C. The stopper device 300 has a configuration, which is the same as the configuration of the stopper device 100 illustrated in FIG. 7B, such that a cushion 170 is provided to the stopper 330 on the distal end side.

The stopper device 300 has a configuration, which is the same as the configuration of the stopper device 10, such that the first limiting portions 58 and the second limiting portions 59 of the stopper 330 are engaged with the flange portion 50 of the screw 22, whereby the axial movement of the stopper 330 is limited.

The mounting hole 312a has a cylindrical shape so as to be dented from the surface of the mount-base member 12 as illustrated in FIG. 9B. The screw receiving portion 338 has a cylindrical shape, and is erected from a bottom portion 344 of the mounting hole 312a as illustrated in FIG. 9C. The screw 22 of the stopper device 300 is screwed with the screw receiving portion 338 of the mount-base member 12 to be mounted on the mount-base member 12.

The abutting portion 157 at the distal end of the stopper 330 is provided with the through-hole 166 that leads to the pan head 49 as illustrated in FIG. 9C, and with this configuration, the screw 22 is made rotatable. The screw head portion 46 is housed in the stopper 330 to prevent the screw 22 from being unintentionally rotated.

Figure 10A:
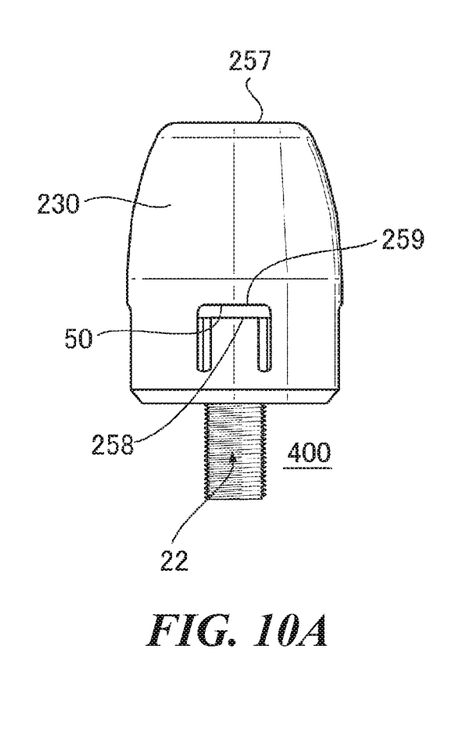
FIGS. 10A and 10B are views for illustrating a stopper device according to the fourth modification.
Figure 10B:
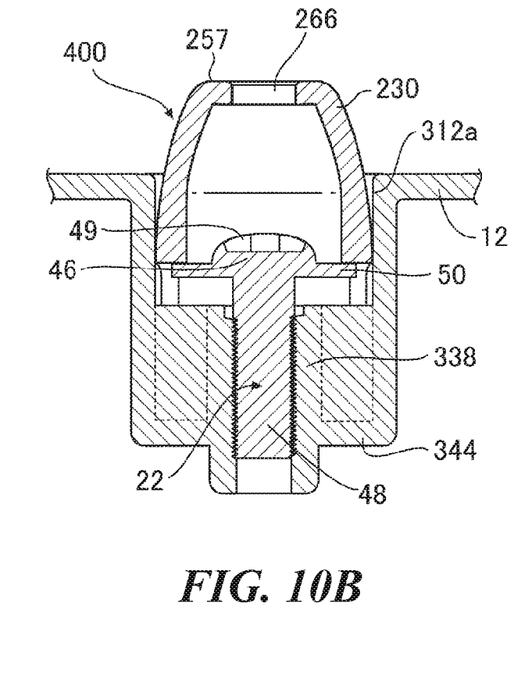

FIGS. 10A and 10B are views for illustrating a stopper device 400 according to the fourth modification. FIG. 10A is a side view of the stopper device 400, and FIG. 10B illustrates a state where the stopper device 400 is mounted in the mounting hole 312a of the mount-base member 12.

The stopper device 400 according to the fourth modification includes no case, and has a configuration such that the screw 22 is screwed with the screw receiving portion 338 provided to the mounting hole 312a, which is different from the configuration of the stopper device 200 illustrated in FIG. 8A. The screw 22 of the stopper device 400 is screwed with the screw receiving portion 338 of the mount-base member 12 to be mounted on the mount-base member 12 as illustrated in FIG. 10B.

The abutting portion 257 at the distal end of the stopper 230 is provided with the through-hole 266 that leads to the pan head 49 as illustrated in FIG. 10B, and with this configuration, the screw 22 is made rotatable. The screw head portion 46 is housed in the stopper 230 to prevent the screw 22 from being unintentionally rotated.

The present invention is not limited to the embodiments described above, and it is also possible to add modifications such as various kinds of design changes to the embodiments based on the knowledge of those skilled in the art. Embodiments to which such modifications are added can also be included within the scope of the present invention. It is also possible to combine the modifications.

In the embodiments, the stopper device 10 is mounted on a box of a glove compartment. However, the present invention is not limited thereto. For example, the stopper device 10 may be configured to be mounted on a lid of a glove compartment to abut on the rim of the box when the lid is closed. The stopper device 10 is mounted on either one of a box as a fixed body, and a lid as an opening and closing body while abutting on the other, the opening and closing body being pivotally supported so as to open and close a recess portion provided to the fixed body.

In the embodiments, the through-hole 66 of the abutting portion 57 is always open. However, the present invention is not limited thereto, and a removable cap may be provided to the through-hole 66. The through-hole 66 may be closed with the cap during normal use while the cap may be removed therefrom when adjusting the height of the stopper 30.

In the embodiments, the second limiting portions 59 are disposed closer to the distal end side than the first limiting portions 58. However, the present invention is not limited thereto. For example, the stopper 30 may be configured such that the rear end portion 56b of the cylindrical portion 56 of the stopper 30 abuts on the bottom portion 44, whereby the axial backward movement of the stopper 30 is limited.

In the embodiments, the screw 22 is screwed in to be mounted on the screw receiving portion 38 of the case 20. However, the present invention is not limited thereto. For example, an insert molding may be provided as the screw receiving portion 38 around the screw 22.

A concavity and a convexity that are engaged with each other may be provided to the outer peripheral surface of the case 20 and the inner peripheral surface of the mounting hole 12a in the embodiments. This configuration can prevent the case 20 from being rotated with the screw 22 when rotating the screw 22.

In the embodiments, the elastic pawl bodies are exemplified as the first limiting portions 58 extending from the rear end side toward the distal end side of the stopper 30. However, the present invention is not limited thereto. For example, the first limiting portions 58 may be elastic pawl bodies that are provided to the cylindrical portion 56 to extend from the distal end side toward the rear end side of the stopper 30. This configuration also allows the first limiting portions 58 to be bendable in the radial direction, which allows the screw 22 to be easily mounted on the stopper 30.

DESCRIPTION OF REFERENCE NUMERALS AND SIGNS

10 Stopper device,
12 Mount-base member,
12a Mounting hole,
20 Case,
22 Screw,
24 Spring,
26 Yoke,
28 Magnet,
30 Stopper,
31 Outer cylindrical portion,
32 Mounting portion,
34 Opening portion,
36 Flange portion,
38 Screw receiving portion,
40 Lateral hole,
41 Extending portion,
42 Rib,
44 Bottom portion,
46 Screw head portion,
48 Shaft portion,
49 Pan head,
50 Flange portion,
51 Side wall,
52 Recess portion,
53a Central hole,
54 Lateral groove,
55 Central hole,
56 Cylindrical portion,
57 Abutting portion,
58 First limiting portion,
59 Second limiting portion,
60 Slit portion,
62 Longitudinal protruding portion,
64 Projecting portion,
66 Through-hole, and
68 Insertion opening.

INDUSTRIAL APPLICABILITY

The present invention relates to a stopper device of which the height of a stopper is adjustable.

The invention claimed is:

1. A stopper device mounted in a mount-base member, comprising:
a stopper including:
a cylindrical portion;
an abutting portion disposed at an axial distal end of the cylindrical portion; and
a through-hole penetrating the abutting portion in an axial direction to communicate with an inside of the cylindrical portion;
a case including a lateral hole; and
a screw including:
a screw head portion having a flange shape to be housed inside the cylindrical portion; and
a shaft portion projecting toward an axial base end of the cylindrical portion,
wherein the shaft portion is screwed into a screw receiving portion,
wherein the screw receiving portion is formed in the case to be mounted on the mount-base member,
wherein the cylindrical portion includes a first limiting portion arranged to limit movement of the stopper toward the axial distal end by being engaged with the screw head portion,
wherein an axial position of the stopper with respect to the case is adjustable by inserting a tool into the cylindrical portion through the through-hole and rotating the screw, wherein a side wall of the cylindrical portion is formed with a cutout penetrating the side wall, wherein the first limiting portion is provided at a peripheral portion of the cutout, and wherein, when the stopper is mounted onto the case, the first limiting portion is expanded by the screw head portion and the lateral hole of the case allows the first limiting portion to be bent outward.

2. The stopper device of claim 1, wherein a portion of the cylindrical portion and an outer peripheral surface of the screw receiving portion, into which the screw is screwed, are disposed to overlap with each other as viewed in a radial direction.

3. The stopper device of claim 1, further including:

a spring housed in the cylindrical portion, and arranged to abut on the screw head portion to urge the abutting portion in a direction away from the screw.

4. The stopper device of claim 1, wherein the first limiting portion includes an elastic pawl body which extends from the peripheral portion of the cutout at a side of the axial base end toward the axial distal end, and is engaged with the screw head portion at a distal end of the elastic pawl body.

5. The stopper device of claim 1, wherein the first limiting portion includes an engaged surface, and wherein the engaged surface and an upper surface of the screw receiving portion simultaneously contact the screw when the axial position of the stopper is at the lowest height.

6. The stopper device of claim 1, wherein the first limiting portion is engaged with a side edge of the flange shape of the screw head portion.

7. The stopper device of claim 1, wherein the first limiting portion is engaged with a side edge of the flange shape of the screw head portion, thereby functioning as a limiting portion for limiting an axial relative movement of the axial position of the screw head portion and the cylindrical portion.

8. The stopper device of claim 1, wherein the case includes:

an outer cylindrical portion;
an opening portion;
the screw receiving portion; and
a bottom portion.

9. The stopper device of claim 8, wherein the case includes a bottom-closed cylindrical shape.

10. The stopper device of claim 8, wherein the outer cylindrical portion includes the opening portion on a first end and the bottom portion on a second end.

11. The stopper device of claim 10, wherein a flange portion is disposed at the first end of the outer cylindrical portion, wherein the flange portion has a shape of extending outward in a radial direction, wherein a pair of mounting portions are disposed on an outer surface of the outer cylindrical portion, and wherein the pair of mounting portions project outward in the radial direction so as to form elastic pawls that are bendable in the radial direction.

12. The stopper device of claim 11, wherein the flange portion and the pair of mounting portions define a given space therebetween such that a rim of a mounting hole of the mount-base member enters the space.

13. The stopper device of claim 12, wherein the lateral hole is provided so as to cut out a side wall of the outer cylindrical portion, wherein, when the stopper is mounted from the opening portion after the screw is screwed with the screw receiving portion, first limiting portions are expanded by the screw head portion and the lateral hole of the case allows the first limiting portions to be bent outward.

14. The stopper device of claim 12, wherein the stopper includes a slit portion formed in the cylindrical portion by cutting out from a rear end along the axial direction, and wherein, when the stopper is housed in the case, a rib of the case enters the slit portion to thereby prevent the stopper from being rotated.

15. The stopper device of claim 8, wherein the screw receiving portion is erected from the bottom portion of the case so as to be screwed with the screw inserted thereinto, wherein the screw receiving portion is coaxial with and smaller in diameter than the outer cylindrical portion, and wherein a rear end portion of the screw receiving portion projects from the bottom portion to have a length for receiving the shaft portion of the screw.

16. The stopper device of claim 8, wherein a rib extends from an outer peripheral surface of the screw receiving portion to connect the screw receiving portion with the outer cylindrical portion, and wherein the rib is erected from the bottom portion of the case to a distal end of the screw receiving portion.

17. A stopper device mounted in a mount-base member, comprising:

a stopper including:
a cylindrical portion;
an abutting portion disposed at an axial distal end of the cylindrical portion; and
a through-hole penetrating the abutting portion in an axial direction to communicate with an inside of the cylindrical portion;

a screw including:
a screw head portion having a flange shape to be housed inside the cylindrical portion; and
a shaft portion projecting toward an axial base end of the cylindrical portion;

a case including a lateral hole; and
a spring housed in the cylindrical portion, wherein the cylindrical portion includes:
a first limiting portion arranged to limit movement of the stopper toward the axial distal end by being engaged with the screw head portion; and
a second limiting portion arranged to limit movement of the stopper toward the axial base end by being engaged with the screw head portion, wherein an axial position of the stopper with respect to the mount-base member is adjustable by inserting a tool into the cylindrical portion through the through-hole and rotating the screw, wherein one end of the spring is arranged to abut on the screw head portion to urge the abutting portion in a direction away from the screw, wherein the screw head portion is loosely fitted in an axial space between the first limiting portion and the second limiting portion, whereby the stopper is movable in the axial direction, wherein a side wall of the cylindrical portion is formed with a cutout penetrating the side wall, wherein the first limiting portion is provided at a peripheral portion of the cutout, and wherein, when the stopper is mounted onto the case, the first limiting portion is expanded by the screw head portion and the lateral hole of the case allows the first limiting portion to be bent outward.

18. The stopper device of claim 17, wherein the first limiting portion includes an elastic pawl body which extends from the peripheral portion of the cutout at a side of the axial base end toward the axial distal end, and is engaged with the screw head portion at a distal end of the elastic pawl body.

* * * * *